United States Patent [19]

Henrich et al.

[11] Patent Number: 4,844,715
[45] Date of Patent: Jul. 4, 1989

[54] PROCESS OF IMPROVING THE SEPARATION OF NOBLE GASES FROM A GAS MIXTURE CONTAINING THEM

[75] Inventors: Edmund Henrich, Liedolsheim; Friedheim Weirich, Neuthard, both of Fed. Rep. of Germany

[73] Assignee: Kernforschungszentrum Karlsruhe GmbH, Karlsruhe, Fed. Rep. of Germany

[21] Appl. No.: 168,962

[22] Filed: Mar. 16, 1988

[30] Foreign Application Priority Data

Mar. 16, 1987 [DE] Fed. Rep. of Germany ....... 3708469

[51] Int. Cl.$^4$ ............................................. B01D 53/14
[52] U.S. Cl. ......................................... 55/44; 55/48; 55/66; 55/89
[58] Field of Search ................. 55/44, 48, 66, 89, 175, 55/208; 202/183, 184; 203/42

[56] References Cited

U.S. PATENT DOCUMENTS

| | | | |
|---|---|---|---|
| 3,742,720 | 7/1973 | Ferguson et al. | 55/66 X |
| 3,762,133 | 10/1973 | Merriman et al. | 55/44 |
| 3,785,120 | 1/1974 | Merriman et al. | 55/48 X |
| 3,850,593 | 11/1974 | Beaujean et al. | 55/66 |
| 3,887,339 | 6/1975 | Robertson | 55/66 |
| 4,129,425 | 12/1978 | Stephenson et al. | 55/66 X |
| 4,305,735 | 12/1981 | Kanak et al. | 55/66 X |
| 4,400,183 | 8/1983 | Henrich et al. | 55/44 |

FOREIGN PATENT DOCUMENTS 3039604 5/1982 Fed. Rep. of Germany .

*Primary Examiner*—Robert Spitzer
*Attorney, Agent, or Firm*—Spencer & Frank

[57] ABSTRACT

A process and an apparatus in a column arrangement for improving the separation of noble gases, particularly krypton, from a gas mixture containing such noble gases using an organic solvent as an absorption agent, utilizing a boiling point spacing of the charged absorption agent of less than or equal to 1.5° C. below the boiling point of the pure absorption agent. The resulting pure absorption agent which is to be recycled, after heating it to a temperature corresponding to the boiling point at the associated operating pressure or up to 10° higher is initially used as a heat exchange medium to regulate the evaporation rate of the charged absorption agent during the desorption of $N_2$ and $O_2$. The pure absorption agent is then used as a heat exchange medium to heat the cold absorption agent charged with Kr, $N_2$ and $O_2$ before the pure absorption agent is brought in contact with the gas mixture of $N_2$, $O_2$ and Kr entering the column.

6 Claims, 3 Drawing Sheets

PROCESS OF IMPROVING THE SEPARATION OF NOBLE GASES FROM A GAS MIXTURE CONTAINING THEM

FIELD OF THE INVENTION

The present invention relates to a process and apparatus for improving the separation of noble gases, particularly krypton, from a gas mixture containing them.

TECHNOLOGY REVIEW

A process for separating noble gases and a column arrangement employed for this purpose are disclosed in German Published Patent Application (without examination) DE-OS No. 3,039,604 and corresponding U.S. Pat. No. 4,400,183. In the process disclosed therein, the absorption agent charged with krypton and small quantities of nitrogen and oxygen flows in a second column of a column arrangement slightly below the boiling temperature of the gas-free solvent out of the externally disposed circulating heat exchanger with subsequently connected circulating heater to the head of the center portion of the second column, the fractionator. During heating of the charged absorption agent in the circulating heat exchanger, in the circulating heater and in the fractionator pack, co-absorbed gas components, i.e. small quantities of nitrogen and oxygen, and part of the product gas are released. If the fractionator head temperature lies only slightly below the boiling temperature of the solvent, the gases released during this partial desorption are saturated with large quantities of absorption agent vapor. With a boiling point spacing of $\leq 1.5°$ C., for example, the percentage of absorption agent vapor is about $\geq 94$ volume percent. Such small boiling point spacings are necessary in the separation of krypton from a gas mixture in order to obtain high krypton purity, primarily if, for safety reasons, the operating pressure lies at or slightly below the ambient pressure. This manner of proceeding, however, has several serious drawbacks. Together with the desorbed gas stream, large quantities of absorption agent vapor are returned to the absorber (upper section of the second column) and there heat the cold absorption agent coming from the absorber into the circulating heat exchanger primarily by means of the condensation heat of the absorption agent. Thus, the warm, pure absorption agent stream coming from the circulating pump cannot be cooled efficiently and the consumption of energy for further cooling of the absorption agent to be returned to the head of the column becomes significantly higher. This is particularly true at low absorber temperatures below $-100°$ C., where larger quantities of air are co-absorbed. However, low absorber temperatures are desirable so as not to increase the dimensions of the apparatus and keep the total energy consumption low. The absorption agent vapor considerably increases the volume of the gas desorbed in the circulating heat exchanger and in the circulating heater as well as in the fractionator pack so that a larger percentage of the product is desorbed and accumulates between the absorber zone and the fractionator zone. This reduces the efficiency of the separation in the absorber and increases the total krypton inventory. In the case of the separation of noble gases in nuclear plants, large radioactive krypton inventories are undesirable for safety reasons:

1. because it is possible that they could be released in the case of a malfunction; and
2. since the radiolytic decomposition of the absorption agent into potentially corrosive products is proportional to the krypton inventory.

SUMMARY OF THE INVENTION

The present invention provides a process for improving the separation of noble gases, particularly krypton, from a gas mixture containing them which process, on the one hand, avoids undesirable krypton accumulations between absorber and fractionator zones, improves the krypton separation from the gas mixture and reduces the krypton inventory in the second column of the column system for normal operation and, on the other hand, in the event of operational malfunctions permits the storage of larger quantities of krypton in the fractionator zone of the column without the occurrence of significant krypton breakthroughs by way of the column head. Until the malfunction is corrected, the krypton inventory should be sealed off so as to block the discharge of product. It is another object of the invention to provide a device in a column arrangement for implementing the process.

This is accomplished by the present invention by a process including:

(a) a pre-purified gas mixture which essentially contains only Xe, Kr, $N_2O$, $O_2$, $N_2$ and $CO_2$ is treated in countercurrent in a first column with an organic solvent as an absorption agent for Xe, Kr, $N_2O$, and $CO_2$ at normal pressure or below normal pressure and at a low temperature;

(b) then the charged absorption agent is heated to a temperature which corresponds to the boiling point at the associated operating pressure, so as to desorb Kr, with Xe, $N_2O$ and $CO_2$ remaining absorbed;

(c) then the absorption agent is again heated to a temperature corresponding to the boiling point at the associated operating pressure to desorb Xe, $N_2O$ and $CO_2$;

(d) the desorbed Kr is transferred into a second column for the separation of $N_2$ and $O_2$; the desorbed gases Xe, $N_2O$ and $CO_2$ are extracted jointly from the first column in order to further purify and separate them and the absorption agent is condensed by cooling and returned;

(e) the gas mixture containing $N_2$, $O_2$ and Kr in the second column is again treated with an organic solvent as the absorption agent for Kr at normal pressure or below normal pressure and at a low temperature;

(f) the absorption agent thus charged with Kr, $N_2$ and $O_2$ is heated to a temperature corresponding to the boiling point at the associated operating pressure, with $N_2$ and $O_2$ being desorbed and extracted while Kr remains absorbed; and (g) the absorption agent which is now charged only with Kr is again heated to a temperature corresponding to the boiling point at the associated operating pressure, thus desorbing the Kr which can then be recovered in practically pure form while the absorption agent is condensed by cooling and returned.

(h) at a boiling point spacing of the charged absorption agent of $\leq 1.5°$ C. below the boiling point of the pure absorption agent in process step (f), the pure absorption agent obtained in step (g) and to be returned is heated to a temperature corresponding to the boiling point at the associated operating pressure or up to 10° higher, is initially utilized as a heat exchange medium to regulate the evaporation rate of the charged absorption agent during the desorption of $N_2$ and $O_2$ in step (f); and then (i) the absorption agent is used as a heat exchange medium to heat the cold absorption agent from step (e) which is charged with Kr, $N_2$ and $O_2$; before it is (j) brought in contact in step (e) with the gas mixture containing $N_2$, $O_2$ and Kr.

In one embodiment of the process according to the invention, high krypton product purity of 99 volume percent or more, without absorption agent vapor, is obtained in step (h) in that the charged absorption agent is heated by the heat exchange medium which is conducted indirectly in countercurrent, to a temperature which, at the end of the heat exchange region for the downwardly flowing charged absorption agent, lies between 0.5° C. and 1.5° C. below the boiling point of the pure absorption agent.

In another embodiment of the process, step (h) includes, in the case of an operational malfunction in which the krypton inventory is to be temporarily enclosed in the second column, i.e. until the malfunction has been corrected, in addition to heating the charged absorption agent by means of the heat exchange medium, heating it with the aid of a heating element to a temperature which, in the upper third of the heat exchange region, is about 5° to about 10° C. higher than the temperature for normal operation.

The apparatus of the invention is a device comprising two columns, each column including three sections, an upper section, a middle section and a lower section, with the upper section being configured as absorber and being connected for gas exchange with the middle section which serves as fractionator. The fractionator is separated on the gas side from the lower section which serves as the degasification section while it is connected with the degasification section by means of a siphon which permits the flow of liquids and with a conduit for circulating the absorption agent in a circuit including a heat exchanger, a cooling device, a heating device, an absorption agent purification device and a circulating pump characterized in that the conduit leading from the base of the column to its head is configured as an internal heat exchanger and is disposed in the column in the space between the fractionator and the absorber, with the portion of the internal heat exchanger exiting from the column being connected with the external heat exchanger.

An advantageous feature of the device is characterized in that the heat exchanger is essentially composed of a plurality of parallel layers (48, 48', 48" of FIG. 3) of parallel pipes (49, 49' of FIG. 3) for the pure absorption agent, with such pipes being rotated with respect to one another from layer to layer by a predetermined angle (See FIGS. 4 and 5), and the layers or pipes are arranged perpendicularly to the direction of flow of the desorbed gases $N_2$ and $O_2$.

In another advantageous embodiment of the apparatus according to the invention, the internal heat exchanger is provided with an adjustable or regulatable additional heating element.

However, the additional heating element may also be employed if an operational malfunction exists which does influence the purity of the product but does not require intentional accumulation.

The process according to the invention can be employed, in particular, for waste gases generated in the dissolution of oxidic nuclear fuels. However, it can also be employed for other gas mixtures which are richer, for example, in $N_2O$, etc. Difluorodichloromethane ($Cl_2CF_2$) can be employed as the absorption agent for xenon, krypton, $N_2O$ and $CO_2$.

DETAILED DESCRIPTION OF THE INVENTION

Figure 1:
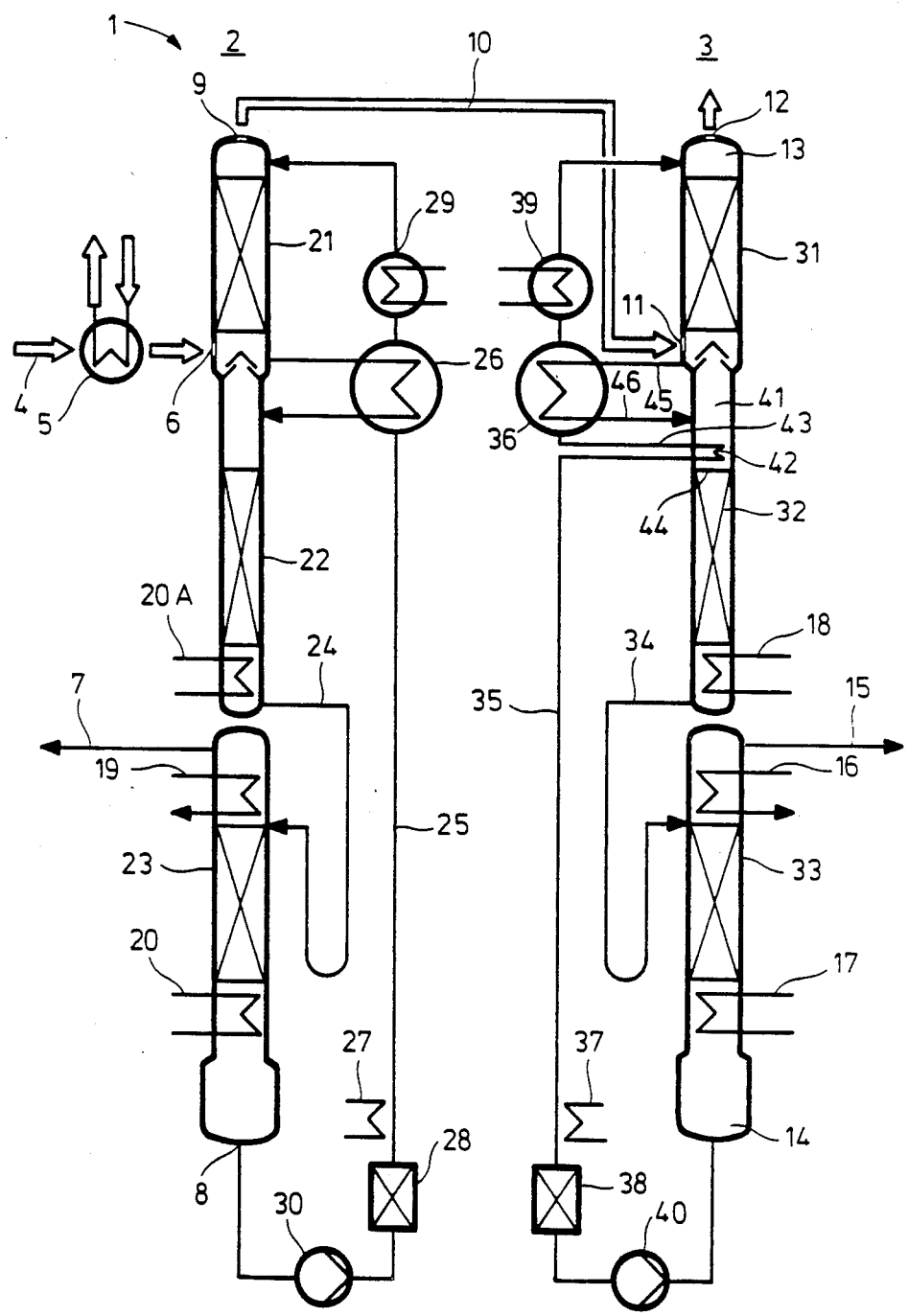
FIG. 1 is a schematic representation of an example of a column arrangement for implementation of the process according to the invention in which the apparatus according to the invention is incorporated in the second column of the arrangement (reference numeral 3).

The invention will now be described in greater detail with reference to the process and column arrangement of DE-OS 3,039,604 [U.S. Pat. No.4,400,183]. After passing through a cooler 5, a pre-purified gas mixture 4 which essentially contains only xenon, krypton, $N_2O$, oxygen, nitrogen and small quantities of $CO_2$ is fed at a temperature of $-130°$ C. into an inlet 6 of a first column 2 of column arrangement 1. Inlet 6 is disposed at a lower end of absorber 21 through which pure $Cl_2CF_2$ flows from the top to the bottom at an entrance temperature of $-120°$ C. In absorber 21, xenon, krypton, $CO_2$, $N_2O$ and small quantities of $O_2$ and $N_2$ are absorbed in the $Cl_2CF_2$ and are discharged from the absorber together with it below the intake point and are then conducted through a heat exchanger 26 in which the charged $Cl_2CF_2$ is heated. The heated, charged absorption agent is fed back into the column in the space between absorber 21 and fractionator 22. Below fractionator 22, there is disposed a heating device 20A which further heats the charged absorption agent so that a temperature of about $-30°$ C. exists within the fractionator. Here, the absorption agent is heated to such an extent that part of the $Cl_2CF_2$ evaporates at boil-away rate of 3 volume percent. This measure is sufficient to cause the krypton contained in the gas mixture to leave the column through outlet 9 at its head together with the nitrogen and the oxygen and to be transferred through conduit 10 into a second column 3. The gas freed of Kr, $N_2$ and $O_2$ is conducted by way of a siphon 24 into a gasification section 23 which is equipped with a heating device 20 and a return flow cooler 19. The degasification section also operates at a temperature of about $-30°$ C. In the degasification section, the $Cl_2CF_2$ is heated to the extent that it evaporates at a boilaway rate of about 16 volume percent and carries the gases xenon, $CO_2$ and $N_2O$ upwards with it. The upper portion of degasification section 23 is separated on its gas side from fractionator 22 so that xenon, $CO_2$ and $N_2O$ can be discharged from the column with the aid of a gas discharge 7. Return flow cooler 19 here cools the $Cl_2CF_2$ vapor to such an extent that practically no absorption agent vapor is discharged. The absorption agent leaving column 2 at a bottom end 8 is circulated by means of a circulating pump 30 through an absorption agent purification section 28 and a conduit for the pure absorption agent 25 past heating device 27, through heat exchanger 26 and a cooling device 29 to the head of the column. Correspondingly, the gas mixture composed of krypton, $N_2$ and $O_2$ introduced into the second column 3 at intake 11 is brought in contact with cooled $Cl_2CF_2$ which circulates in countercurrent in absorber 31. The temperature at a top part 13 of absorber 31 is about $-148°$ C. The charged solvent then passes through absorber discharge 45 into external heat exchanger 36 and from there through intake 46 for the charged absorption agent, which has been heated in the heat exchanger 36, into a space 41 between absorber 31 and fractionator 32. After re-entering the column, the charged absorption agent flows through internal heat exchanger 42, where it is heated from an entrance temperature of about $-85°$ C. to a temperature of about $-32°$ C. Since the major portion of the volume of $N_2$ and $O_2$ has already been separated in absorber 31 and has been discharged through a gas discharge 12 at head 13 of column 3, the small quantities of $N_2$ and $O_2$ which reached fractionator 32 operating at $-30°$ C. together with the krypton charged $Cl_2CF_2$ are heated to such an extent that a boil-away rate of about 1 volume percent results. Thus, only the krypton remains in the absorption agent and together they are conducted past heating device 18 and then by way of siphon 34 to degasification section 33. Below the degasification zone, which has a temperature of about $-30°$ C., there is disposed a heating device 17 which heats the krypton charged absorption agent at a bottom part 14 of the column 3 until a boil-away rate of about 4 volume percent $Cl_2CF_2$ is realized. This causes the krypton to be desorbed and it can be discharged from the column in very pure form through krypton discharge 15. The $Cl_2CF_2$ vapor component is condensed in return flow cooler 16. The condensate is combined again with the major quantity of the absorption agent and is circulated by means of circulating pump 40 and absorption agent purification device 38 past heating device 37. Before the pure absorption agent reaches external heat exchanger 36 through conduit 35, the conduit 35 is reintroduced into column 3 in the space 41 between absorber 31 and fractionator 32 above a top section 44 of the fractionator 32, at which point the conduit 35 constitutes the internal heat exchanger 42 and then an upper portion 43 leaves column 3 again, finally entering external heat exchanger 36. From there, conduit 35 leads through a cooling device 39 back to the head 13 of column 3.

Figure 2:
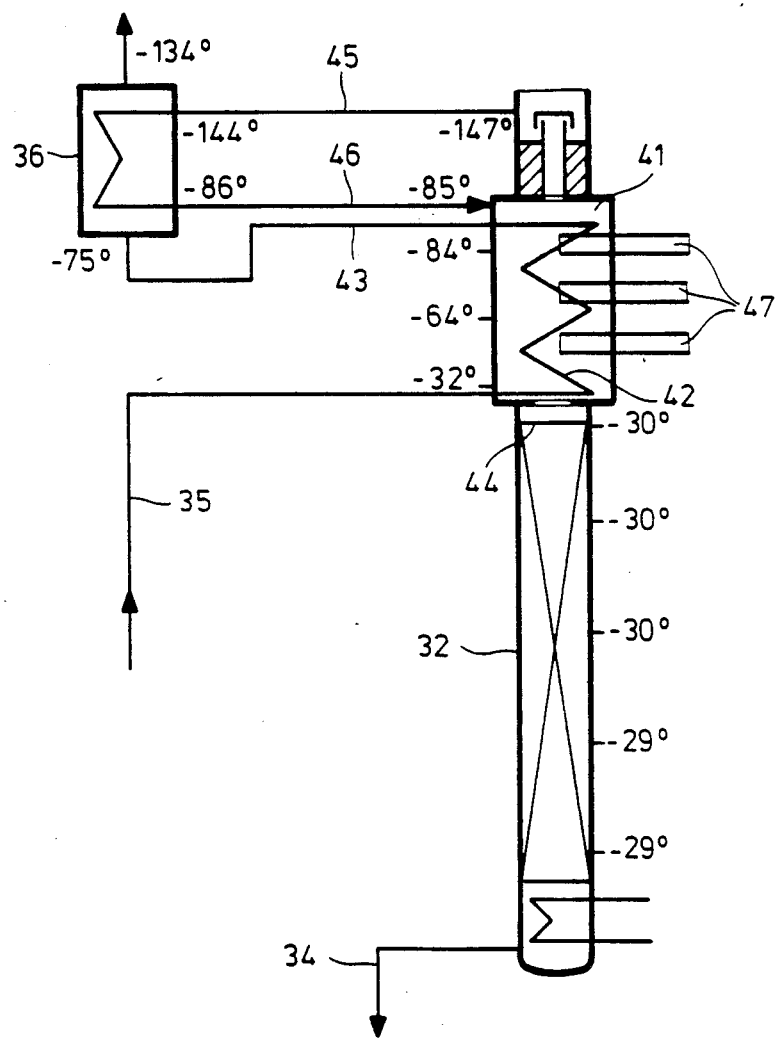
FIG. 2 is also a schematic representation of the combination according to the invention of absorber discharge, external heat exchanger, internal heat exchanger, fractionator and the conduit for the pure absorption agent.
Figure 3:
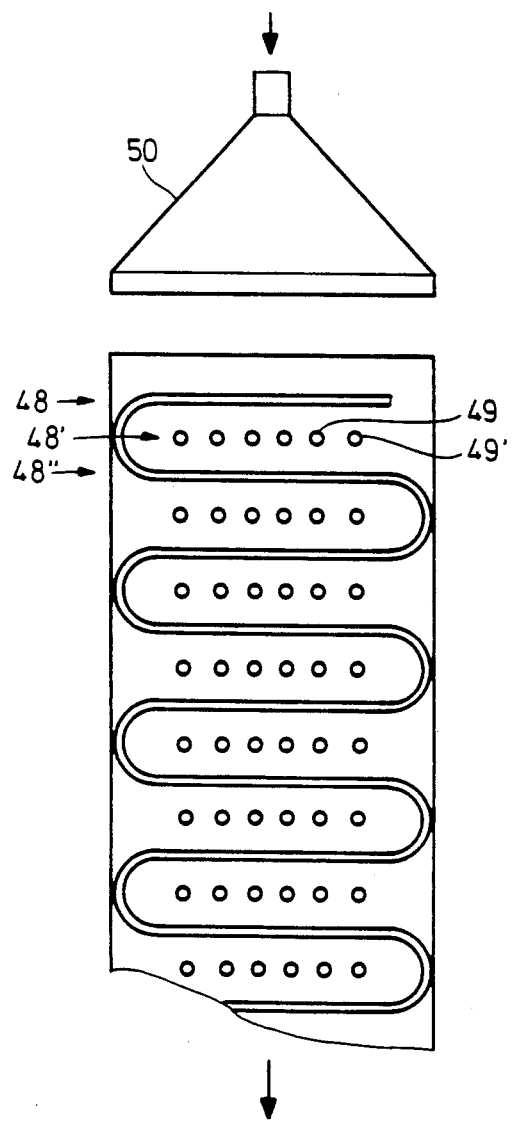
FIG. 3 is an example of a possible embodiment of the internal heat exchanger with a liquid distributor 50 disposed thereabove.
Figure 4:
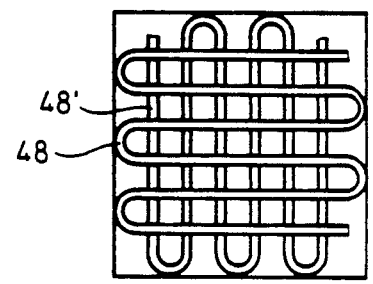
FIGS. 4 and 5 show two of the preferred cross sections of the internal heat exchanger.
Figure 5:
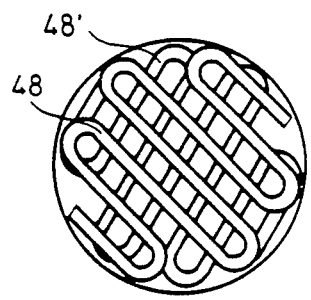

The operation of the invention will be described with reference to two exemplary examples and in conjunction with FIG. 2.

Instead of a genuine waste gas mixture from the dissolution process of oxidic nuclear fuels in a reprocessing system, a simulated gas mixture of krypton, $N_2$ and $O_2$ was fed through inlet 11 and neon was fed into the degasification zone 33 of column 3. The inert gas neon was added to obtain a reference value for the volume flow of the gas components in the analysis of the product gas by means of gas chromatography. Neon hardly dissolves in the $Cl_2CF_2$ absorption agent and can therefore be ignored, without having to fear that errors could occur, in the calculation or purity examination of krypton. The examination of the temperature profile of the process according to the invention in the region of the discharge of the charged absorption agent from the absorber, the external heat exchanger, the internal heat exchanger and the fractionator, yielded the exemplary temperature values shown in FIG. 2. The discharge of the charged absorption agent in absorber discharge conduit 45 had a temperature of $-147°$ C., was heated to $-144°$ C. before entering into external heat exchanger 36 and left the latter through conduit 46 at $-86°$ C. Upon entrance into internal heat exchanger 42, the charged absorption agent had a temperature of $-85°$ C. which changed as follows:

in the upper third of the internal heat exchanger: $-84°$ C.;
in the middle third: $-64°$ C.;
and in the bottom third: $-32°$ C.

In the fractionator head the temperature of the charged solvent was $-30°$ C.; the following temperatures were measured at other points in the direction toward siphon 34:

$-30°$ C., below it:
$-30°$ C., below it:
$-29°$ C., and in the vicinity of heating device 18:
$-29°$ C.

The pure absorption agent heated by heating device 37 and conducted through conduit 35 flowing through internal heat exchanger 42 from the top to the bottom had a temperature, in part 43 where it left column 3, of $-75°$ C. before it entered the external heat exchanger. The pure absorption agent leaving external heat exchanger 36 then had only a temperature of $-134°$ C. This temperature profile was obtained in a test during the separation process in order to obtain high product purity.

The pure absorption agent stream coming from pump 40 and heated by heating device 37 is fed by mean of conduit 35 to internal heat exchanger 42 and flows through it from the bottom to the top while the charged absorption agent stream flows through internal heat exchanger 4 from the top to the bottom and is heated while doing so while the uncharged absorption agent stream is cooled. This is accomplished in that the pure absorption agent is conducted through parallel pipes (49, 49', 49", . . .) and is deflected several times in one plane 48" before it is transferred to the next higher plane 48 or leaves internal heat exchanger 42.

Results

Test 1: Separation Process For Attaining High Product Purity

If Kr product purities of >99% with respect to $N_2$ and $O_2$ are to be realized, the operating mode of the internal heat exchanger 42 must be set to this requirement.

In this case, the uncharged solvent stream which is conducted through internal heat exchanger 42 is heated to temperatures above the boiling point and thus the downwardly flowing, charged solvent stream in the lower portion of internal heat exchanger 42 is indirectly brought close to the boiling temperature. This measure has the result that the charged solvent is freed of the majority of $N_2$ and $O_2$ and the subsequently connected fractionator 32 has a quasi constant temperature profile or, more precisely, desorption factor profile. The small quantities of $N_2$ and $O_2$ still dissolved in the solvent are completely desorbed in this way and thus a high product purity is realized.

| Measured Kr concentrations: | (volume %) |
|---|---|
| absorber inlet 11 | 0.02% |
| absorber outlet 12 | $10^{-6}$% |

-continued

| Measured Kr concentrations: | (volume %) |
| --- | --- |
| internal heat exchanger, top | 0.46% |
| internal heat exchanger, middle | 1.59% |
| internal heat exchanger, bottom | 4.5% |
| product outlet 15 | 54.44% Kr |
| | 33.54% Ne |
| | 11.92% $Cl_2CF$ |

Test 2: Operational Malfunction With Intentional Accumulation

If there are operational malfunctions (e.g. a product outside regular specifications), the internal heat exchanger 42 offers an opportunity to block Kr in the system for a longer period of time and to recycle it until suitable operating conditions have been re-established. Internal heat exchanger 42 may then be heated by means of electrical heating elements 47 by supplying energy into its upper portion so that the charged solvent experiences a temperature increase of 5° to 10° C. in the upper third of internal heat exchanger 42. This causes Kr to be accumulated in internal heat exchanger 42.

| Measured Kr concentrations: | (volume %) |
| --- | --- |
| absorber inlet 11 | 0.1% |
| absorber outlet 12 | $10^{-5}$% |
| internal heat exchanger, top | 75% |
| internal heat exchanger, middle | 61% |
| internal heat exchanger, bottom | 35% |
| product outlet 15 | 40% Kr |
| | 14.02% Ne |
| | 43.98% $Cl_2CF_2$ |
| | 2% $N_2 + O_2$ |

For the intentional accumulation of krypton, the product outlet is closed and the krypton product which does not conform to specifications is returned to the inlet 11 of column 3 or to the inlet 6 of column 2 by way of a bypass line not shown in the drawing. This path is continued until a pure product is present again at product outlet 15.

The present disclosure relates to the subject matter disclosed in German Patent Application No. P 37 08 469.0 of Mar. 16th, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A process for the separation of noble gases from a gas mixture, comprising:
  (a) treating a gas mixture which essentially contains only Xe, Kr, $N_2O$, $O_2$, $N_2$ and $CO_2$ in countercurrent in a first column with a first portion of organic solvent as a first absorption agent for Xe, Kr, $N_2O$, and $CO_2$ at not more than ambient pressure and at a low temperature to dissolve said gas mixture of Xe, Kr, $N_2O$ and $CO_2$ in said first absorption agent;
  (b) heating the first absorption agent containing dissolved gases to desorb Kr, with Xe, $N_2O$ and $CO_2$ remaining dissolved in said first adsorption agent;
  (c) heating the first absorption agent again to desorb Xe, $N_2O$ and $CO_2$;
  (d) transferring the desorbed Kr into a second column for the separation of $N_2$ and $O_2$; extracting the desorbed gases Xe, $N_2O$ and $CO_2$ from the first column to further purify and separate them; and cooling and condensing the first absorption agent and returning it to step (a);
  (e) treating the gas mixture containing $N_2$, $O_2$ and Kr in the second column with a second portion of organic solvent as a second absorption agent for Kr at not more than ambient pressure and at said low temperature to dissolve said gas mixture of $N_2$, $O_2$, and Kr in said second absorption agent;
  (f) heating the second absorption agent containing dissolved Kr, $N_2$ and $O_2$ to desorb and extract $N_2$ and $O_2$ while Kr remains dissolved in said second absorption agent; and
  (g) heating the second absorption agent again to desorb and recover Kr; and cooling and condensing the second absorption agent and returning it to step (e);
  (h) wherein the second absorption agent containing dissolved Kr, $N_2$ and $O_2$ in step (f) has a boiling point of 1.5° C. or less below that of a pure second absorbing agent; and wherein the pure second absorption agent is used as a heat exchange medium to regulate the evaporation rate of the changed second absorption agent during the desorption of $N_2$ of $O_2$ in step (f); and wherein
  (i) a pure second absorption agent is used as a heat exchange medium to heat the second absorption agent from step (e) which is charged with Kr, $N_2$ and $O_2$; before the second absorption agent is recycled by being
  (j) brought in contact in step (e) with the gas mixture containing $N_2$, $O_2$ and Kr.

2. A process as defined in claim 1, wherein in step (h), the second absorption agent containing dissolved gases is heated by the heat exchange medium conducted in countercurrent to a temperature which, at the end of a heat exchange region for the downwardly flowing, charged absorption agent lies between about 0.5° C. and about 1.5° C. below a boiling point of a pure absorption agent to obtain a high Kr product purity of 99 volume % without absorption agent vapor.

3. A process as defined in claim 1, wherein in step (h), a Kr inventory is retained in the second column until an operational malfunction is corrected, and heating is effected with the aid of a heating element to a temperature in the upper third of the heat exchange region which is higher by about 5° to about 10° C. than the temperature of said upper third during normal operation.

4. A process as defined in claim 1, wherein each said columns is composed of an upper section, a middle section and a lower section; the upper section, configured as an absorber, being connected on a gas side with the middle section configured as a fractionator; the fractionator being separated on the gas side from the lower section which is a degasification section, and being connected with the degasification section by way of a siphon which permits the flow of liquids and is connected with a conduit for circulating an organic solvent as an absorption agent, the conduit including a heat exchanger, a cooling device, a heating device, an absorption agent purifying device and a circulating pump, comprising:
  a conduit conducted from the lower section of the column to the upper section of the column, said conduit being configured as an internal heat exchanger which is disposed in the column in a space between the fractionator and the absorber, with a part of said internal heat exchanger which exits from the column being connected with an external heat exchanger.

5. A process as defined in claim 4, wherein the internal heat exchanger is essentially composed of a plurality of parallel arranged layers of parallel pipes for the pure absorption agent, said layers being rotated by a predetermined angle from layer to layer, with the layers or pipes being arranged perpendicularly to the direction of flow of the desorbed gases $N_2$ and $O_2$.

6. A process as defined in claim 4, wherein the internal heat exchanger is provided with an additional adjustable heating element.

* * * * *